July 12, 1966  O. L. I. BROWN ETAL  3,260,039
CENTRIFUGAL FILTER
Filed Nov. 23, 1962  3 Sheets-Sheet 1
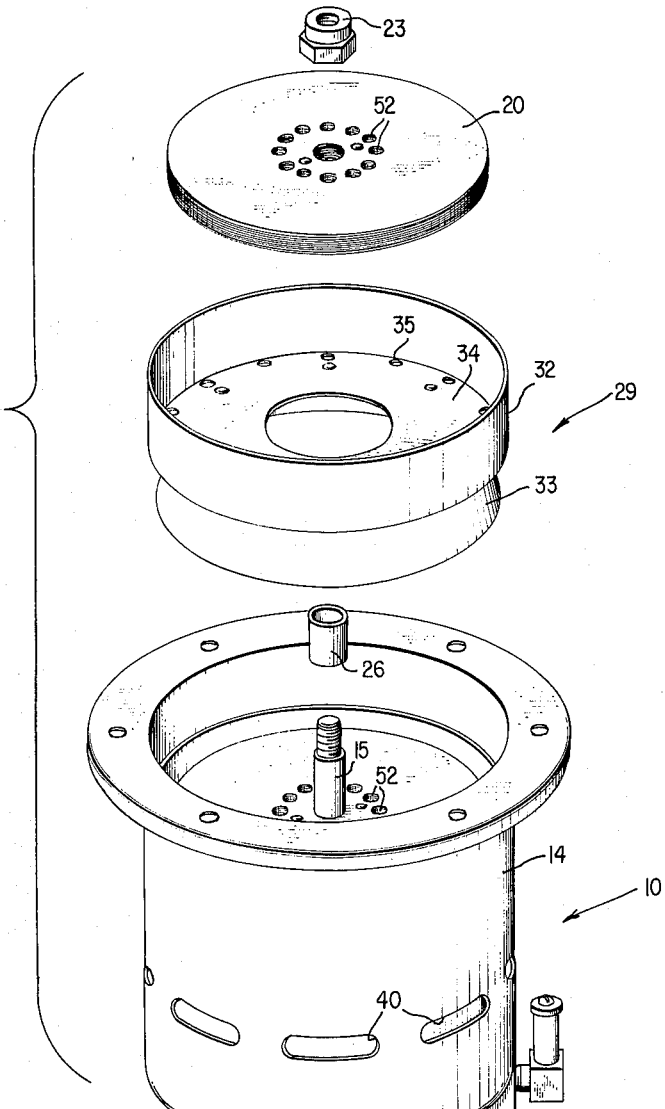
FIG. 1
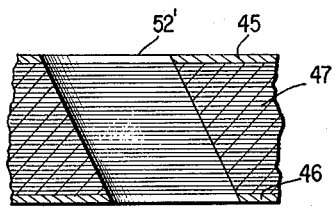
FIG. 5
DIRECTION OF
ROTATION
INVENTORS.
OLIVER L. I. BROWN
MASON P. WILSON, JR.
ROGER L. SCHONEWALD
BY
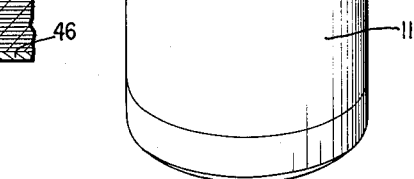
ATTORNEYS.

INVENTORS.
OLIVER L. I. BROWN
MASON P. WILSON, JR.
ROGER L. SCHONEWALD

ATTORNEYS

July 12, 1966    O. L. I. BROWN ETAL    3,260,039
CENTRIFUGAL FILTER
Filed Nov. 23, 1962    3 Sheets-Sheet 3
FIG. 3
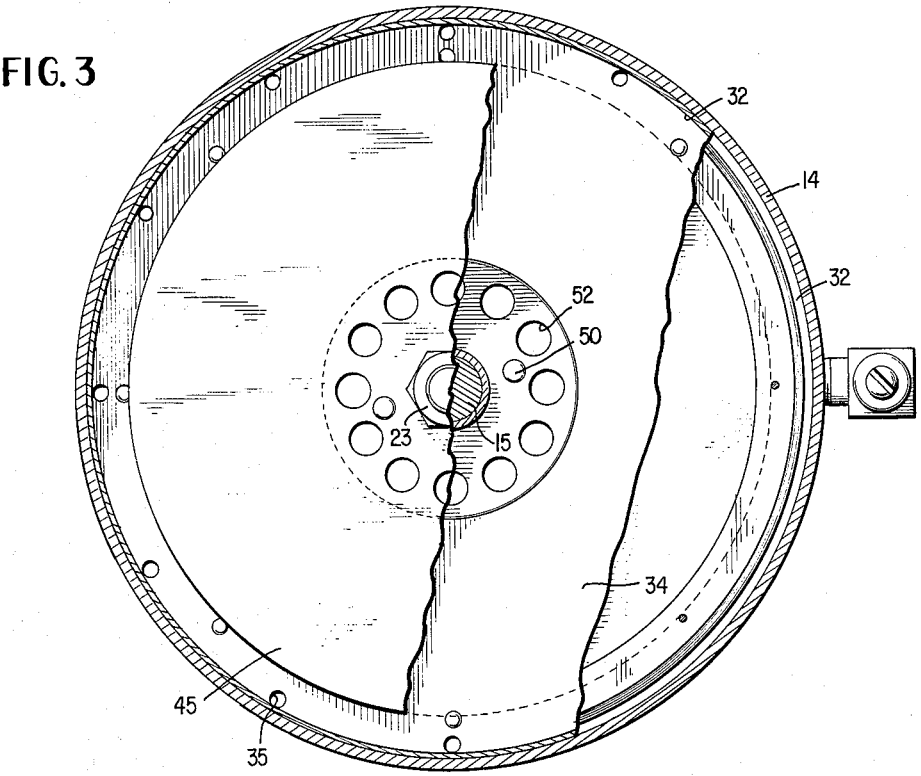
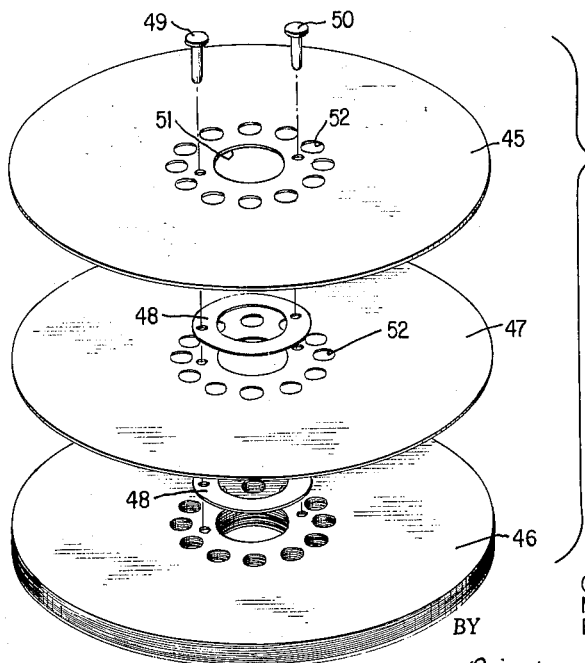
FIG. 4
INVENTORS.
OLIVER L. I. BROWN
MASON P. WILSON, JR.
ROGER L. SCHONEWALD
BY Diggins, O'Boyle & Harmon
ATTORNEYS.

3,260,039
CENTRIFUGAL FILTER
Oliver L. I. Brown, Quaker Hill, Mason P. Wilson, Jr., Hartford, and Roger L. Schonewald, Norwich, Conn., assignors to General Dynamics Corporation, New York, N.Y., a corporation of Delaware
Filed Nov. 23, 1962, Ser. No. 239,725
11 Claims. (Cl. 55—403)

This invention relates to centrifugal filters generally and more particularly is directed to improvements in filters for removing minute suspended liquid particles from aerosols.

It is well known in the art that one of the major problems involved in dealing with aerosols is to cause the individual minute suspended particles to coalesce so that they may be effectively removed from the gaseous suspension. In such prior art considerations, it has been well known to centrifugally act upon aerosols to cause the suspended medium to be propelled against the inner wall of a chamber to force a certain percentage of extraction of the particles.

The difficulty or problem in the prior art as indicated above has been to thoroughly and efficiently remove such particles from the aerosol while within a centrifugal chamber. This difficulty arises from the very minute character of most of the suspended liquids; such particles or droplets opposing coalescence, thereby making it rather difficult to gain any reasonably good efficiency within the confines of a plural stage centrifugal filter in the removal of such particles during the journey of an aerosol through the chamber. The centrifugal or spin filter of the present invention overcomes these difficulties by utilizing a mechanical principle wherein the oil particles are forced to coalesce until enough mass is accumulated to separate the oil from the air stream.

It is therefore a principal object of this invention to provide an improvement in centrifugal filters for removing minute particles from aerosols.

It is a more specific object of this invention to provide a new method of treating aerosols whereby to remove minute particles from such suspensions.

Another object of this invention is to provide an improvement in the centrifugal structure to which an aerosol may be subjected whereby to thoroughly departiclize the aerosol within the confines of the centrifugal chamber.

A still further object of this invention is to provide an improved impeller structure for centrifugal filters which is of such a character as to cause very minute suspended liquid particles of aerosols to coalesce within the impeller of each stage of the purifier to thereby aid in the efficiency of extraction of the particles from the suspending gaseous medium.

Another object of this invention is to provide a centrifugal filter for removing minute liquid particles from aerosols in which a minimum of pressure drop is created between the inlet and outlet of the filter.

A further object of this invention is to provide a centrifugal filter for removing liquid particles from aerosols in which a relatively slow moving aerosol is subjected to relatively fast moving, minute, passageway type impingement surfaces whereby to cause coalescence of the particles into larger, more readily removable droplets.

With the foregoing and other objects in view, the invention resides in the following specification and appended claims, certain embodiments and details of construction of which are illustrated in the accompanying drawings in which:

FIGURE 1 is an exploded view of one section of the essential parts of the centrifugal filter comprising the invention;

FIGURE 3 is a partially sectioned cut-away view taken along line 3—3 of FIGURE 2;

FIGURE 4 is an exploded view in detail of one impeller of the filter, and

FIGURE 5 is a fragmentary, detailed view of a modified form of aerosol inlet passage for the impeller.

Figure 2:
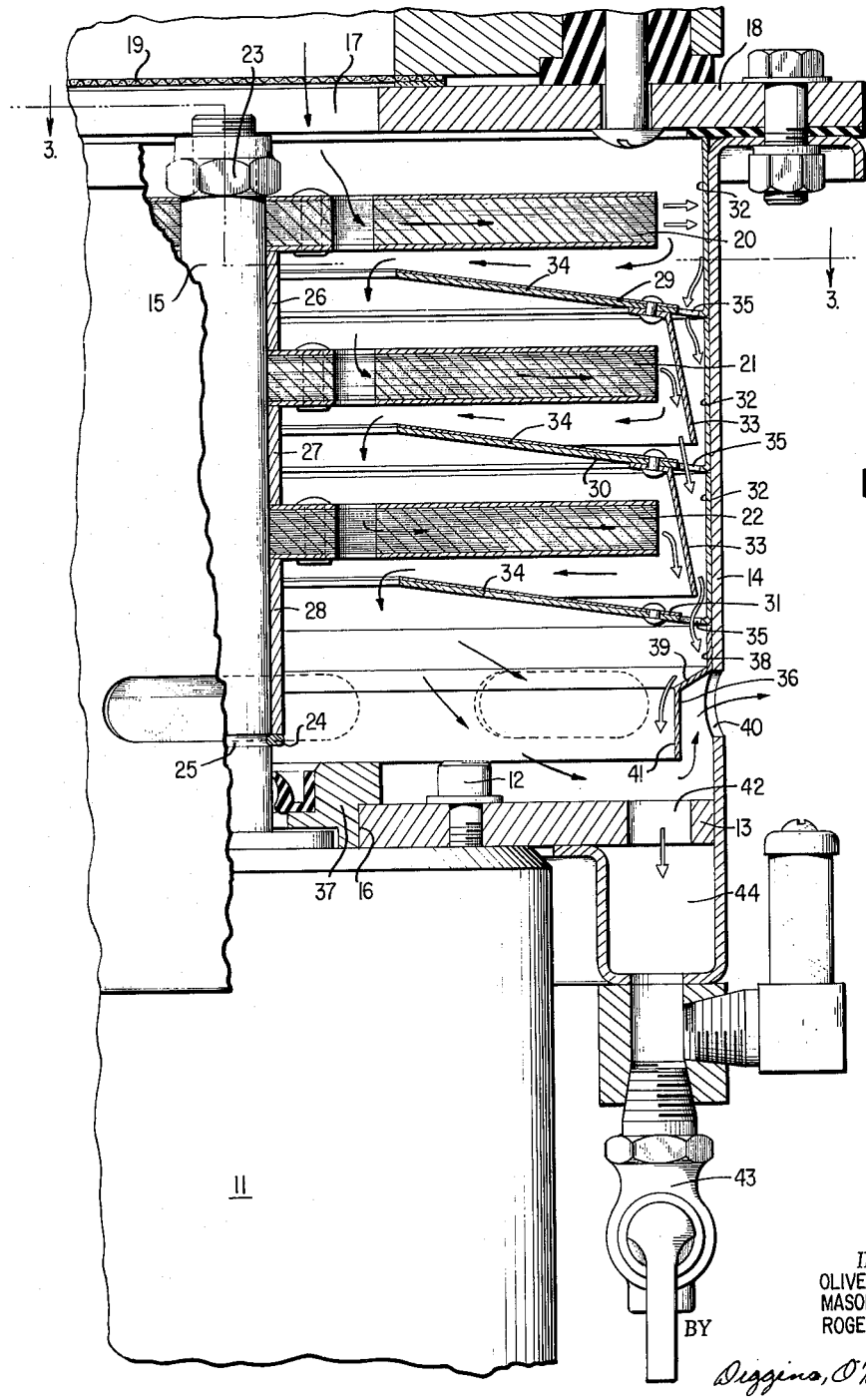
FIGURE 2 is a partial sectioned view in elevation illustrating the details of construction of the filter chamber and impellers as well as the general path of an aerosol passing through the chamber.

Referring more particularly to the drawings, it will be seen that the filter is illustrated generally at 10 and includes a drive motor 11 connected as by bolts 12 to the bottom wall 13 of the filter chamber 14. The drive motor is provided with an extended shaft 15 which enters the chamber 14 substantially axially thereof through a sealed opening 16. As illustrated in FIGURE 2, the shaft 15 extends from the bottom wall 13 to a point adjacent the aerosol inlet 17 in upper wall 18. A screen 19 is provided across the inlet opening 17 for obvious reasons.

Positioned in axially spaced sections of the chamber 14 and held in drive connection by suitable means, such as by keys (not shown), to the drive shaft 15 are a plurality of impellers 20, 21 and 22. As is best seen in FIGURE 2, the impellers are spaced between a retaining nut 23 at the end of shaft 15 and a stop ring 24 mounted in a groove 25 of the shaft 15. Disposed between adjacent impellers are spacers 26, 27 and 28.

Alternately positioned within the chamber 14 above the bottom wall 13 with regard to the impellers 20, 21 and 22 are a plurality of baffle members 29, 30 and 31. The baffle members 29 and 30 are identical and include an upright chamber wall engaging concentric portion 32, a downwardly directed depending flange 33 and an inwardly and somewhat upwardly directed planar surface 34 which is extended inwardly of the chamber 14 to a position adjacent to the shaft 15 but spaced therefrom whereby to provide a free passage for aerosol from one section of the chamber 14 as formed by the baffles to the next as will be hereinafter described.

Between the wall engaging portion 32 and the point of connection of the depending flange 33 of each baffle member 29 and 30, there is provided a plurality of drain holes 35, whereby liquid collected against the upright portion 32 during operation of the filter may drain downwardly of the chamber as will be hereinafter described.

The lower baffle 31 is substantially the same as baffles 29 and 30 but does not include the same depending type of skirt. On the other hand it does include a supporting spacer element acting in a manner similar to skirts 33. Such supporting element 36 has a lower edge being supported in spaced relationship to the bottom wall 13 of the filter by the seal bushing 37 provided in opening 16 about the shaft 15. The spacer 36 includes an outer wall portion 38 engaging against the inner wall of chamber 14, an angularly and inwardly directed wall portion 39 adjacent to gaseous outlet ports 40 and a skirt portion 41. The inclined portion 39 and skirt portion 41 of spacer 36 receives liquid material draining through ports 35 in each baffle and directs the same through an opening 42 in bottom wall 13 to a drain outlet 43. In FIGURE 2 only one such hole 42 is illustrated, but it is quite obvious that a plurality of such holes may be provided in the bottom wall 13 to direct drain material peripherally along the bottom wall 13 into a collecting chamber 44 from whence the collected material may be suitably drained through outlet 43.

Referring now specifically to FIGURE 4, it will be noted that a detailed illustration is given of the construction of an impeller, all impellers in the device as illustrated being identical in character. Each impeller is provided with a pair of spaced rigid plates 45 and 46 between which are positioned a plurality of relatively thin disks which may be of any suitable material such as paper. Another extremely suitable disk material for example, is thin sheet metal which has been pierced, etched or otherwise treated to create a fine screen. These disks 47 are in turn spaced from each other by interleaved washers 48. The resulting stacked disk impeller is connected together in any suitable means, such as by rivets 49 and 50. Disposed in axial alignment in a position adjacent to but spaced from the drive shaft opening 51 extending through the impeller are a plurality of mated ports 52 which provide axial aerosol inlet passages to each impeller. In the modified form of FIGURE 5 these passages are illustrated as being inclined in the direction of rotation of the impeller. This modified form wherein the passage 52' is inclined has a tendency to increase the efficiency of passing the aerosol entering the impeller from the axial passage to the plurality of radial passages as will hereinafter be described. The thickness of the spacers 48 in the various impellers is on the order of .005 inch, enough to create substantially planar, very minute, radial passages in each impeller whereby aerosols passing through said radial chambers will be acted upon during operation of the filter to cause coalesence of even the most minute suspended liquid particles. For example, it has been found that by such a construction, liquid particles on the order of a third micron will have a tendency to coalesce along each of the facing planar surfaces of the passageways during the centrifugal action in two separate paths so that upon expulsion from the periphery of an impeller toward the upright portion 32 of one of the baffle members such coalesced particles will have sufficient size as to be thrown out of the gaseous suspension in each succeeding section of the filter.

Thus in operation of the filter, referring to FIGURE 2, and by following the arrows indicating the flow passages, it will be noted that the aerosol will follow the reversing path indicated by the single line arrows whereas the coalesced liquid droplets formed in each section as a result of the centrifugal action are directed first against baffle portion 32 and then downwardly as indicated by the double-lined arrows through the drain openings 35 to the drain chamber 44. The draining liquid is blocked from reentrainment with the gaseous medium by skirts 33 in the upper sections of the filter, and by the skirt portion 41 of spacer 36 from reentrainment with gases passing to outlets 40. It is quite obvious that by utilizing the particular impeller structure in a plurality of stages, herein shown as three, that whatever suspended particles may still be in the aerosol after the medium has been passed through the impeller 20 will again pass through similar impellers 21 and 22 before being permitted to leave the chamber 14 via the ports 40. It has been found that the construction as illustrated with three stages has produced a highly efficient method and construction for removing substantially all of the suspended liquid from such aerosols.

This construction finds immediate use in connection with high speed machinery and lubricants therefore wherein mists of lubricant have a tendency to pervade the surrounding atmosphere and wherein it is desirable to keep such atmosphere completely clear of noxious, dangerous and odoriferous fumes. In this use of a centrifugal filter with machinery bearing lubrication systems, it is particularly desirable to create as little pressure drop as possible to avoid damaging the machinery by drawing off lubricants from the sump and bearings. The present construction, due to the fineness of the planar impeller passages creates a minimum of pressure drop between the inlet 17 and the outlets 40. Actually, the aerosol is only subjected to centrifugal forces in the impeller passages to cause the coalesence, and there is relatively little pumping action of the type which would be caused by a bladed impeller with consequential substantial pressure drops.

It is realized that the present construction may be subject to many specific structural modifications, all of which are deemed to be within the purview of this invention, which is intended to be limited only to a liberal interpretation of the appended claims.

What is claimed and desired to be secured by United States Letters Patent is:

1. A centrifugal filter for removing liquid particles from aerosols which comprises a chamber including an inlet, a liquid outlet and gas outlets, a motor connected to said chamber and having a driven shaft extending into the chamber, a plurality of spaced impellers having drive connections with said shaft, each impeller including a plurality of planar disks, said impellers each comprising a plurality of aerosol inlet passages spaced from said driven shaft and extending through said disks, annular spacers coaxial with and interleaved with the disks of said impellers and forming with said disks a plurality of minute planar passages extending outwardly from said annular spacers radially of said disks, a plurality of baffle means forming a series of adjacent chamber sections, each of said baffle means comprising a substantially cylindrical portion abutting the interior wall of said chamber, each said baffle means comprising a further portion adapted for the reception of aerosols and extending inwardly from said cylindrical portion toward said drive shaft between adjacent ones of said impellers, each of said baffle means having a depending skirt attached to said further portion outwardly of the periphery of the next adjacent downstream impeller, said further portion being substantially circular and provided with means facilitating the transfer of aerosols from said further portion to said plurality of passages in one of said adjacent ones of said impellers, said last-named means comprising an orifice in said further portion adjacent the ends of said last-named plurality of passages, and liquid drain means in said baffle means comprising a plurality of orifices, said liquid drain means being disposed adjacent said interior wall.

2. The invention according to claim 1 wherein said aerosol inlet passages are inclined in the direction of impeller rotation.

3. The invention according to claim 1 wherein the spacing between said disks is on the order of .005 inch.

4. The invention according to claim 1 wherein each of said impellers comprises supporting plates, said planar disks and said spacers being disposed between said supporting plates.

5. The invention according to claim 4 wherein said planar disks are made of paper, the spacing between said paper disks being on the order of .005 inch.

6. A centrifugal filter for removing liquid particles of partial micron size and larger from aerosols which comprises a chamber including an inlet, a liquid outlet and gas outlets, drive means connected to the chamber and including a driven shaft extending into the chamber, a plurality of spaced impellers having drive connections with said shaft, each impeller consisting of a plurality of filter disks and annular spacers coaxial with said disks forming laminae defining a plurality of minute, radial planar passages, each impeller including a plurality of aerosol inlet passages in said disks radially spaced from said drive connections and disposed in a circular pattern, each of said inlet passages in a respective impeller connecting with all said planar passages in said respective impeller, a plurality of baffle means each having a substantially cylindrical portion supported within and abutting the interior wall of said chamber, each said baffle means further comprising a portion extending inwardly from a respective cylindrical portion to a position adjacent to but spaced from said drive shaft to form a plurality of chamber sections including an orifice coaxial with said shaft and of a diameter substantially that of said circular pattern, whereby to direct that portion of the aerosol derived from the planar passages under the centrifugal force of one of said impellers toward the inlet passages of the next impeller during operation, and liquid drain means in each said baffle means, said liqiud drain means being disposed adjacent said interior wall, said drain means directing coalesced particles to said drain outlet with the suspending gas of the aerosol being directed toward the gas outlets following the centrifugal action on the same by the impeller in the last section of the chamber.

7. The invention according to claim 6 wherein the aerosol inlet passages in each impeller are inclined in the direction of impeller rotation.

8. The invention according to claim 6 wherein said planar passages are of a height approximating .005 inch.

9. The invention according to claim 6 wherein each baffle means is provided with a depending skirt portion adjacent said chamber interior wall to effectively prevent reentrainment of the extracted, draining liquid with the aerosol.

10. The invention according to claim 6 wherein each impeller comprises a pair of supporting plates, said filter disks and said spacers being disposed between said supporting plates.

11. The invention according to claim 10 wherein said filter disks are made of paper, the spacing between said paper disks being on the order of .005 inch.

References Cited by the Examiner
UNITED STATES PATENTS

| Number | Date | Name | Class |
|---|---|---|---|
| 585,188 | 6/1897 | Davis | 55—400 |
| 1,013,248 | 1/1912 | Wilkinson | 103—84 |
| 1,061,142 | 5/1913 | Telsa. | |
| 1,095,835 | 5/1914 | Fiddes | 55—345 X |
| 1,562,118 | 11/1925 | Moscovitch | 55—400 X |
| 2,002,033 | 5/1935 | Kopsa | 55—402 X |
| 2,071,393 | 2/1937 | Doherty | 55—206 X |
| 2,087,834 | 7/1937 | Brown et al. | 104—84 X |
| 2,127,746 | 8/1938 | Logan | 55—403 |
| 2,197,539 | 4/1940 | Hickman | 55—206 |
| 2,228,750 | 1/1941 | Brock | 55—403 |
| 2,335,641 | 11/1943 | Buckley | 55—206 X |
| 2,336,476 | 12/1943 | Fulcher | 55—403 |
| 2,706,016 | 4/1955 | Schulumbohm | 55—400 |
| 2,869,838 | 1/1959 | Ryder | 55—400 |
| 2,941,872 | 1/1960 | Pilo et al. | |
| 3,032,954 | 5/1962 | Racklyeft | 55—400 X |

FOREIGN PATENTS

| Number | Date | Country |
|---|---|---|
| -147,254 | 7/1952 | Australia. |
| 542,540 | 11/1955 | Belgium. |
| 52,853 | 6/1944 | France. |
| | | (1st add. to No. 882,205) |
| 518,798 | 3/1955 | Italy. |

HARRY B. THORTON, *Primary Examiner.*

REUBEN FRIEDMAN, *Examiner.*

D. TALBERT, *Assistant Examiner.*